3,645,953
POLYMER LUBRICANT

Raymond R. Hindersinn, Lewiston, and Charles S. Ilardo, Tonawanda, N.Y., assignors to Hooker Chemical Corporation, Niagara Falls, N.Y.
No Drawing. Filed Nov. 7, 1969, Ser. No. 874,950
Int. Cl. C08k 1/40, 1/44
U.S. Cl. 260—32.6 R   9 Claims

ABSTRACT OF THE DISCLOSURE

Compounds of the formula

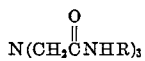

wherein R is alkyl of 12 to 30 carbon atoms are employed as lubricants for vinyl compositions.

BACKGROUND OF THE INVENTION

Rigid vinyl chloride polymers are difficult to fabricate because the processing temperatures conventionally employed are very close to the temperatures at which the vinyl polymers begin to degrade. Additionally, as the molecular weight of vinyl polymers such as rigid polyvinylchloride, which is known for its excellent chemical resistance, self-extinguishing characteristics, strength and weatherability, increases, the mechanical properties improve but fabrication becomes even more difficult. Thus, the need for polymer lubricants is apparent. The present invention provides novel lubricants which have outstanding efficiency, compatibility and provide improved clarity for rigid vinyl systems.

It is the object of this invention to provide new polymer lubricants for rigid vinyl compositions. It is also the object of this invention to provide polymer lubricants having increased efficiency. A further object of the invention is to provide lubricants which are compatible with rigid vinyl compositions. A still further object is to provide lubricants which will in turn provide improved clarity to the resulting polymeric object. Other objects will become apparent to those skilled in the art from the following detailed description.

SUMMARY OF THE INVENTION

This invention relates to new polymer lubricants. More particularly, this invention relates to the use of compounds of the formula

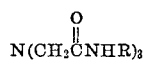

wherein R is alkyl of 12 to 30 carbon atoms as polymer lubricants for vinyl polymers.

DESCRIPTION OF THE INVENTION

In accordance with the invention, novel polymer lubricants are provided which are nitrilo tris(N-acetamide)s of the formula

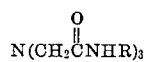

wherein R is alkyl of 12 to 30 carbon atoms, preferably 15 to 25 carbon atoms, the nitrilo tris(N-acetamide)s can be prepared by the ammonolysis of an ester with a primary amine or can be produced in accordance with co-pending application Ser. No. 741,201, filed June 28, 1968. The process of the copending application comprises forming a polyhydroxy ester of ingredients comprising nitrilotriacetic acid and a glycol, and thereafter reacting said polyhydroxy ester with a compound selected from the group consisting of ammonia, primary amines, secondary amines and mixtures thereof, wherein said compound has a dissociation constant of less than $1 \times 10^{-7}$.

Typical nitrilo tris(N-acetamide)s include nitrilo tris-(N - dodecylacetamide); nitrilo tris(N - pentadecylacetamide); nitrilo tris(N - hexadecylacetamide); nitrilo tris-(N-stearylacetamide); nitrilo tris(N-octadecylacetamide); nitrilo tris(N-behenylacetamide); nitrilo tris(N-tetracosylacetamide); nitrilo tris(N-tallowacetamide); and the like.

The nitrilo tris(N-acetamide)s are employed in conjunction with vinyl polymers and copolymers. Thus, the polymers employed include the following well-known and widely-used products: polyvinyl acetate, polyvinyl chloride, polyvinyl chloride - acetate copolymer, polyvinyl acetals such as polyvinylacetal and polyvinylbutyral and the like, polyvinylidene chloride and the like. The vinyl polymers and copolymers can be either rigid or flexible (plasticized) but are preferably rigid. The preferred vinyl polymer or copolymer is polyvinyl chloride. The vinyl polymers or copolymers can contain a variety of additives in order to provide a means of producing finished products with literally any desired properties. Typical additives include stabilizers, such as tin, barium, cadmium, calcium, zinc, and lead; plasticizers such as dioctylphthalate, tricresylphosphate, dibutoxyethylphthalate, triglycol di-(2-ethylhexanoate) and the like; dyes; pigments; solvents; heat stabilizers such as alkaline earth carbonates, hydroxides, oxides and salts; fillers; and the like.

The nitrilo tris(N-acetamide)s are mixed with vinyl polymer or copolymer in a proportion sufficient to provide the desired lubrication, i.e., a lubricating amount. It has been found that because of the efficiency of the nitrilo tris(N-acetamide)s, only a proportion of the amount of lubricant conventionally used need be employed. Generally, the nitrilo tris(N-acetamide) is about 0.1 to about 5 percent based on the total weight of the composition and preferably about 0.2 to about 2 weight percent.

The following examples are presented to illustrate the invention but are not intended to limit it. Throughout the specification and claims, all parts and percentages are by weight and temperatures in degrees centigrade unless specified otherwise.

EXAMPLE 1

Preparation of nitrilo tris(N-stearylacetamide)

A charge of 567 grams of nitrilo tris(2-ethylhexyl acetate), 131 grams of ethylene glycol, 500 grams of 2-ethylhexanol and 980 grams of stearylamine was heated at 112 degrees centigrade until titration indicated that the reaction was complete. This took 22 hours. The product was recrystallized from isopropyl alcohol. The yield was 71 percent and the product had a melting point of 110–112 degrees centigrade.

EXAMPLE 2

About 760 parts ethylene glycol and about 106 parts nitrilotriacetic acid were esterified at 200–250° C. for 5 hours under a nitrogen sparge. Nitrilo tris(N-stearylacetamide) was prepared by heating a charge of 1433 grams of crude ethylene glycol triester of nitrilotriacetic acid at 75–80° C. and adding 2135 grams of stearylamine over a period of 50 minutes. The temperature was raised to 112° C. until titration indicated the reaction was complete. This took 3.5 hours. The product was recrystallized from isopropyl alcohol. The yield was 90.5% and the product had a melting point of 109–110.5° C.

EXAMPLE 3

Nitrilo tris(N-stearylacetamide) as a polymer lubricant

Nitrilo tris(N-stearylacetamide), 0.25 part was mixed with 100 parts of rigid polyvinyl chloride and tested in an electric bowl Brabender Plasti-Corder at 130° C. and the time from introduction of the sample to fusion was measured. The time to fusion was 9 minutes and the torque at fusion peak was 5400 mg. The foregoing was repeated except that calcium stearate was employed as the lubricant. The time for the calcium stearate lubricant sample to fuse was 2.5 minutes and the torque fusion peak was 5000 mg. A comparison of fusion time indicates that the nitrilo tris(N-stearylacetamide) is a more efficient external lubricant than calcium stearate.

EXAMPLE 4

Three samples were prepared employing 100 parts of rigid polyvinyl chloride, 1 part of Thermolite 66 (tin mercaptide stabilizer) and 0.25 part of lubricant. The compositions were tested on a Brabender Plasti-Corder and an oil bowl was employed to minimize frictional heat build-up. The oil bowl temperature was 170 degrees centigrade. The fusion times and torque at fusion peak are given in Table I.

TABLE 1

| Lubricant | Fusion time (minutes) | Torque at fusion time (mg.) | Mix viscosity at 190° C. (mg.) |
|---|---|---|---|
| Nitrilo tris(N-stearylacetamide) | 14 | 2,500 | 1,850 |
| Calcium stearate | 10 | 2,300 | 1,750 |
| Hoechst wax OP | 9.5 | 2,400 | 1,750 |

The nitrilo tris(N-stearylacetamide) is the most efficient external lubricant as judged by fusion time.

EXAMPLE 5

The nitrilo tris(N-stearylacetamide) was compared to various commercial lubricants and the results of the comparison are shown in Table II. The composition tested contained 100 parts of rigid polyvinyl chloride, 1 part lubricant and 5 parts of M&T T-31 (tin mercaptide stabilizer). All formulations were milled for 1 hour or until the composition stuck to the mil roll and a sample was taken at 5, 10, 20, 30, 40, and 50 minutes to observe stability and lubricity. Also, a large sheet was taken at 10 minutes for press polish clarity evaluation. The mill setting was 0.020 inch. "Drag" is a term used to describe the property of the sheet to cling to the mill roll while not actually sticking. The Brabender conditions were 350 Fahrenheit at 100 revolutions per minute. A 5-minute waiting period was observed between each sample in order to allow the heat in the machine to return to the starting point.

inch and it was observed that the color and clarity of the final composition was good.

EXAMPLE 7

About 0.44 weight percent of nitrilo tris(N-stearylacetamide) was compounded with rigid polyvinyl chloride and bottles were molded from the composition. The bottles exhibited excellent impact strength, clarity and resistance to crazing when bent. The excellent efficiency of the lubricant is demonstrated by the small amount employed. Additionally, several bottles were subjected to a water blush test. Clear polyvinyl chloride tends to "water blush," i.e., develop a whitish cast, upon aging. In this test, the bottles were aged in 57 degrees centigrade distilled water for 1 month. This period of time roughy corresponds to about 1 year of shelf exposure. The bottles did not exhibit water blush during the test.

EXAMPLE 8

Nitrilo tris(N-tallowacetamide) as a polymer lubricant

Nitrilo tris(N-tallowacetamide) was prepared by following the procedure of Example 1 substituting tallow amine (Foremost Chemical Products Co.) for the stearylamine. A sample was prepared by mixing 0.5 part of the nitrilo tris(N-tallowacetamide), 0.5 part Thermolite 66 and 100 parts of rigid polyvinyl chloride. A second sample was prepared in which the acetamide was replaced by calcium stearate. The samples were tested in a Brabender Plastic-Corder at 180 degrees centigrade and 40 revolutions per minute. The results are given in Table III.

TABLE III

| Lubricant | Fusion time (minutes) | Torque at fusion time (mg.) | Mix viscosity (mg.) |
|---|---|---|---|
| Nitrilo tris(N-tallowacetamide) | 7.0 | 2,400 | 1,800 |
| Calcium stearate | 4.5-5 | 2,000 | 1,500 |

The foregoing results indicate that the nitrilo tris(N-tallowacetamide) is a more efficient external lubricant than calcium stearate.

Various modifications can be made in the invention without departing from the spirit and scope thereof. The various embodiments of the invention disclosed herein serve to further illustrate the invention but are not intended to limit it.

We claim:

1. A composition comprising (1) a vinyl polymer or copolymer selected from the group consisting of polyvinyl chloride, polyvinyl acetate, polyvinyl acetal, polyvinyl

TABLE II

| Lubricant | Drag on mill | Sticking to mill, minutes | Relative fusion on mill | Relative clarity | Brabender time to maximum fusion torque, minutes |
|---|---|---|---|---|---|
| Nitrilo tris (N-stearylacetamide) | Low | (1) | Slow | Fair/good | 2¾ |
| Calcium stearate | Low | 30 | Fast | Poor | 2½ |
| Mark TT | None | 25/30 | do | Good | 2¼ |
| Advawax 140 | High | 5 | do | No sample | 1 |
| Advawax 280 | do | 5 | do | do | 2¼ |
| Polyethylene | Low | 40 | Very slow | Very poor | (2) |
| Acrawax B | High | 2 | Fast | No sample | 1¾ |
| Acrawax C | do | 2 | do | do | 1½ |
| Mineral oil | do | 3 | Moderate | do | 1¼ |
| Palmitic acid | Low | 5 | Slow | do | 4¾ |

1 No sticking.
2 Did not fuse (10 min.).

This table demonstrates that the nitrilo tris(N-stearylacetamide) was the most effective of the foregoing lubricants.

EXAMPLE 6

A flexible polyvinyl chloride composition was prepared employing 100 parts of polyvinyl chloride, 50 parts diisooctylphthalate, 1 part of BC-100 (Ba/Cd stabilizer) and 0.5 part nitrilo tris(N-stearylacetamide). The composition was milled at 340° F. with a mill setting of 0.020 butyral, polyvinylidene chloride and co-polymers thereof and (2) from about 0.1 to about 5.0 percent based on the total weight of the composition of a lubricant for said polymer or copolymer of the formula

wherein R is alkyl of 12 to 30 carbon atoms.

2. A composition in accordance with claim 1 wherein said lubricant is nitrilo tris(N-stearylacetamide).

3. The composition of claim 2 wherein said vinyl polymer or copolymer is polyvinyl chloride.

4. The composition of claim 3 wherein said vinyl polymer or copolymer is rigid polyvinyl chloride.

5. A composition in accordance with claim 1 wherein said lubricant is nitrilo tris(N-tallowacetamide).

6. A composition according to claim 5 wherein said vinyl polymer is polyvinyl chloride.

7. The composition of claim 6 wherein said vinyl polymer is rigid polyvinyl chloride.

8. A composition of claim 1 wherein said vinyl polymer is polyvinyl chloride.

9. A composition of claim 8 wherein said vinyl polymer is rigid polyvinyl chloride.

References Cited

UNITED STATES PATENTS 3,326,974    6/1967    Rainer _____ 260—557

THEODORE MORRIS, Primary Examiner

T. DE BENEDICTIS, Sr., Assistant Examiner

U.S. Cl. X.R.

260—32.4, 558 A, 561 A, K